(12) United States Patent
Abbaszadeh et al.

(10) Patent No.: US 11,421,653 B2
(45) Date of Patent: Aug. 23, 2022

(54) SYSTEMS AND METHODS FOR MULTIVARIABLE CONTROL OF A POWER GENERATING SYSTEM

(71) Applicant: General Electric Renovables Espana, S.L., Barcelona (ES)

(72) Inventors: Masoud Abbaszadeh, Clifton Park, NY (US); Fabiano Daher Adegas, Sao Paulo (BR); Fernando Javier D'Amato, Niskayuna, NY (US)

(73) Assignee: General Electric Renovables Espana, S.L., Barcelona (ES)

( * ) Notice: Subject to any disclaimer, the term of this patent is extended or adjusted under 35 U.S.C. 154(b) by 29 days.

(21) Appl. No.: 17/097,099

(22) Filed: Nov. 13, 2020

(65) Prior Publication Data
US 2022/0154688 A1    May 19, 2022

(51) Int. Cl.
*G05B 13/04* (2006.01)
*F03D 7/02* (2006.01)

(52) U.S. Cl.
CPC ........... *F03D 7/028* (2013.01); *G05B 13/041* (2013.01); *G05B 13/042* (2013.01); *F05B 2270/32* (2013.01)

(58) Field of Classification Search
CPC .............................. G05B 13/041; G05B 13/042
USPC ......................................................... 700/286
See application file for complete search history.

(56) References Cited

U.S. PATENT DOCUMENTS

| | | | |
|---|---|---|---|
| 7,092,856 B1 | 8/2006 | Hojo et al. | |
| 7,805,205 B2 | 9/2010 | Santos | |
| 9,158,291 B1 | 10/2015 | Gahinet | |
| 2019/0257289 A1 | 8/2019 | Schlipf et al. | |

FOREIGN PATENT DOCUMENTS

| | | |
|---|---|---|
| CN | 104319771 A | 1/2015 |
| CN | 103306894 B | 8/2015 |
| CN | 109296500 A | 2/2019 |
| CN | 110134015 A | 8/2019 |
| EP | 2933477 A1 | 10/2015 |
| EP | 2995812 A1 | 3/2016 |

(Continued)

OTHER PUBLICATIONS

Robust data driven H-infinity control for wind turbine, By: Young-Man Kim; received in revised form May 3, 2016; accepted Jun. 3, 2016 (Year: 2016).*

(Continued)

*Primary Examiner* — Jigneshkumar C Patel
(74) *Attorney, Agent, or Firm* — Dority & Manning, P.A.

(57) ABSTRACT

Systems and methods are provided for the robust, multivariable control of a power generating asset via H-infinity loop shaping using coprime factorization. Accordingly, a controller of the power generating asset computes a gain value for an H-infinity (H∞) module in real-time at predetermined sampling intervals using an actuator dynamic model. The controller then determines an acceleration factor based, at least in part, on the gain value of the H∞ module. Based, at least in part on the acceleration vector, the controller generates a control vector. An operating state of at least one component of the power generating asset is changed based on the control vector.

19 Claims, 5 Drawing Sheets

(56) References Cited

FOREIGN PATENT DOCUMENTS

JP            2003112224 A      4/2003

OTHER PUBLICATIONS

Khoete et al., Robust H-Infinity Control for DFIG to Enhance Transient Stability during Grid Faults, Proceedings of the World Congress on Engineering and Computer Science 2016, vol. 2, San Francisco USA, Oct. 19, 2016, pp. 1-6.
European Search Report for EP Application No. 21206470.3, dated Apr. 20, 2022.
Nichols, R.A. et al., Gain Scheduling for H-Infinity Controllers: A Flight Control Example, IEEE Transactions on Control Systems Technology, IEEE Service Center New York, NY, US, vol. 1, No. 2, Jun. 1, 1993, pp. 69-78.

* cited by examiner

SYSTEMS AND METHODS FOR MULTIVARIABLE CONTROL OF A POWER GENERATING SYSTEM

FIELD

The present disclosure relates in general to power generating assets, and more particularly to systems and methods for robust, multivariable control of power generating assets via H-infinity loop shaping.

BACKGROUND

As disclosed herein, power generating assets may take a variety of forms and may include power generating assets which rely on renewable and/or nonrenewable sources of energy. Those power generating assets which rely on renewable sources of energy may generally be considered one of the cleanest, most environmentally friendly energy sources presently available. For example, wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple wind turbine generators that are operable to supply power to a transmission system providing power to a power grid.

In operation, the performance of the power generating asset may be subject to external conditions. For example, when configured as a wind turbine, the operating performance of the wind turbine may be subject to wind speed, wind shear, and other environmental factors. These external conditions may have a direct impact on the operational setpoints of the components of the power generating asset or on the components themselves. For example, the external conditions may have a direct impact on blade pitch, turbine rotational velocity, and may introduce vibrations into the tower or the rotor blades. These disturbances may alter the power generation level, stability, efficiency, and other performance metrics of the power generating asset.

The power generating asset is a highly dynamic and coupled system with intertwined control design constraints and performance criteria. Typically, conventional controllers consist of a number of single input/single output (SISO) loops, with each SISO loop having access to a single sensor and actuator. As a result, the control signals commanded by each individual SISO loop may conflict and determining which command signal may be implemented by the component in operation may be difficult to determine. Consequently, the power generating asset may not produce an optimal amount of power for the given environmental conditions.

Thus, the art is continuously seeking new and improved systems and methods that address the aforementioned issues. As such, the present disclosure is directed to systems and methods for robust, multivariable control of power generating assets via H-infinity loop shaping.

BRIEF DESCRIPTION

Aspects and advantages of the invention will be set forth in part in the following description, or may be obvious from the description, or may be learned through practice of the invention.

In one aspect, the present disclosure is directed to a method for controlling a power generating asset. The method may include computing, via a controller, a gain value for an H-infinity (H∞) module in real-time at predetermined sampling intervals using an adjusted-actuator dynamic model. The method also includes determining, via the controller, an acceleration (i.e. second derivative) vector based, at least in part, on control commands calculated by the H∞ module. Additionally, the method may include generating, via the controller, a control vector based, at least in part, on the acceleration vector. The method may further include changing an operating state of at least one component of the power generating asset based on the control vector and sensor measurements. The control formulation based on second derivative of the control command vector (aka, control command acceleration), may allow incorporating input constraints on the control command rate and acceleration into the control design. For example, in a wind turbine this may include rate and acceleration constraints on the blade pitch angles and the generator torque command. This may be achieved via adding the first and second derivatives of the control command vector as additional states into the system model used in the multivariable control gain computation.

In an embodiment, generating the control vector may also include combining, via the controller, the acceleration vector from the H∞ module with an operating point vector generated by an operating point scheduling module.

In an additional embodiment, the adjusted-actuator dynamic model may include an asset model and an actuator dynamic model. The asset model may be combined with the actuator dynamic model.

In a further embodiment, the method may include weighting the adjusted-actuator dynamic model and/or the acceleration vector based on an input constraint and/or an output constraint.

In yet a further embodiment, the input constraint and/or the output constraint may include an operational constraint and/or a performance constraint. The operational and performance constraints may include a structural loading constraint, and actuator constraint, a speed regulation, a power regulation, and/or a setpoint tracking performance specification.

In an embodiment, computing the gain value for the H∞ module may also include resolving, via the controller, a pair of discrete-time algebraic Riccati equations at each of the predetermined sampling intervals.

In an additional embodiment, the H∞ module may be formulated based on loop shaping and may be synthesized using coprime factorization.

In a further embodiment, applying the coprime factorization may generate a closed-form solution for the controller.

In yet a further embodiment, each of the predetermined sampling intervals may have a duration of less than 50 milliseconds.

In an embodiment, an output of the H∞ module may include a second derivative of the control vector. Generating the control vector may include integrating, via an integration module, the second derivative of the control vector so as to determine the acceleration vector. Additionally, the method may include integrating, via the integration module, the acceleration vector so as to determine the control vector.

In an additional embodiment, the asset model may include an analytical linearization model or at least one precomputed linear model.

In another aspect, the present disclosure is directed to a system for controlling a power generating asset. The system may include at least one sensor operably coupled to the power generating asset and a controller communicatively coupled to the sensor(s). The controller may include at least one processor configured to perform a plurality of operations. The plurality of operations may include any of the operations and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
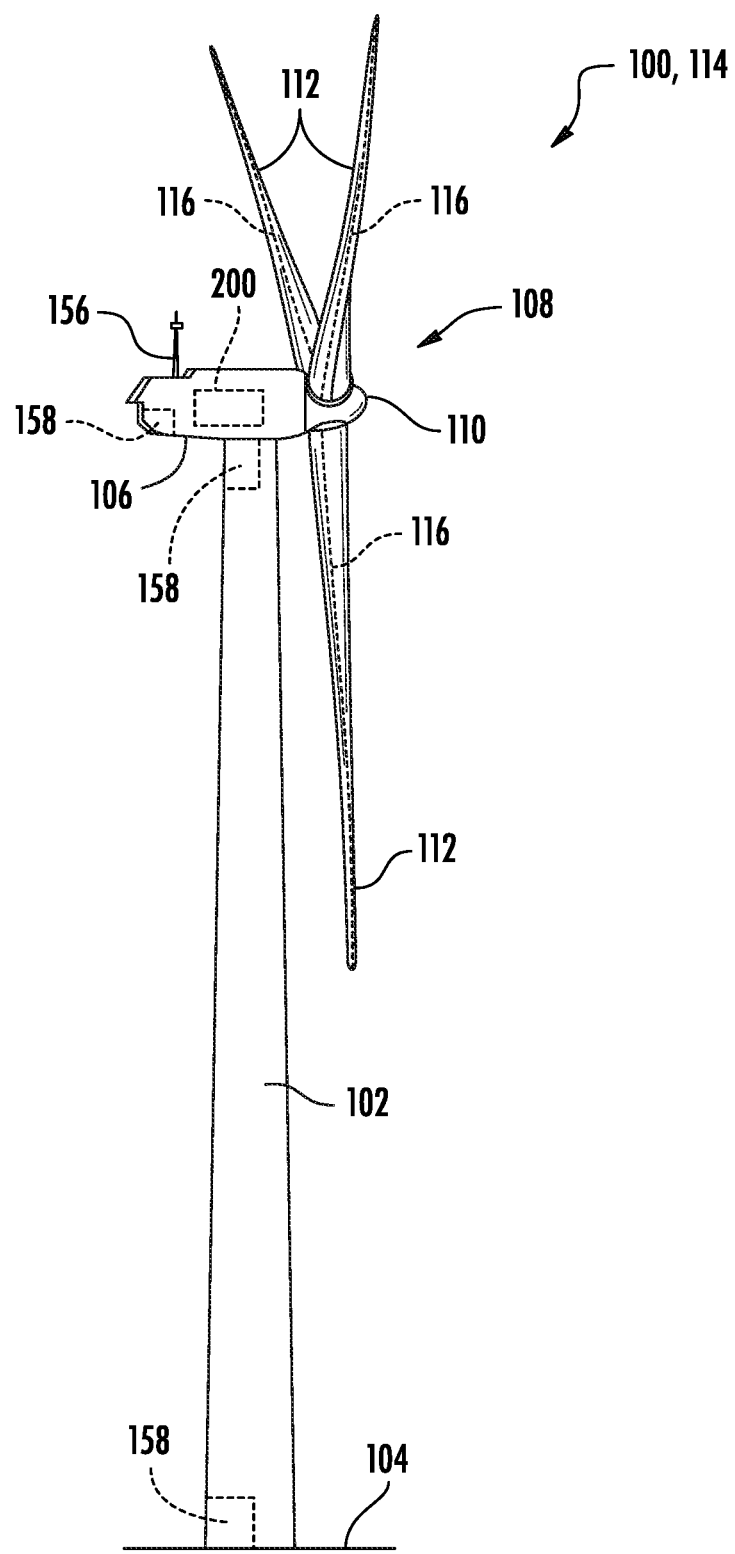
FIG. 1 illustrates a perspective view of one embodiment of a power generating asset configured as a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling a power generating asset, such as a wind turbine. The disclosed systems and methods may provide a systematic and unified method for controlling a power generating asset using a consolidated multivariable controller implementing a multiple input/multiple output (MIMO) control approach. The utilization of a consolidated, multivariable controller may provide a simplified and unified control architecture with increased performance over conventional approaches implementing SISO loops with multiple actuators. Accordingly, the systems and methods described herein provide a method for robust, optimal, linear, multivariable, state-dependent H-infinity (H∞) control of the power generating asset. This control may be based on a state-dependent Riccati approach.

In an embodiment, the method may be centered around a robust H∞ control module wherein the H∞ control may seek to bound the energy gain of the system from the exogenous disturbances to the desired outputs. The gains of the H∞ module may be computed at every sampling interval through the real-time solution of exactly two discrete-time algebraic Riccati equations. The utilization of robust control may facilitate the control of the power generating asset in the presence of unknown dynamics and subject to unknown disturbances. The H∞ module may be formulated based on loop shaping and may be synthesized using coprime factorization. The utilization of the H∞ module may facilitate achievement of an optimal disturbance attenuation in every sampling period and eliminate the need for gamma-iteration, hence, enabling real-time implementation at millisecond level sampling rates. Accordingly, a recursive Riccati Solver may be utilized for computational efficiency.

As described herein, the control system may utilize a pre-stored bank of linearized models scheduled in real-time in some instances based on linearization around an instantaneous time-varying operating point. However, in additional instances, the control system may utilize a linear model computed in real time using real-time evaluation of an analytical linearization model around an instantaneous time-varying operating point. Additionally, the control system may consider a wide range of operational and performance constraints including structural loading, such as wind turbine tower and blade vibration constraints, actuator constraints (e.g. blade pitch angle in general torque), and speed/power regulation or setpoint tracking performance specifications.

Referring now to the drawings, FIG. 1 illustrates a perspective view of one embodiment of a power generating asset 100 according to the present disclosure. As shown, the power generating asset 100 may be configured as a wind turbine 114. In an additional embodiment, the power generating asset 100 may, for example, be configured as a solar power generating asset, a hydroelectric plant, a fossil fuel generator, and/or a hybrid power generating asset.

When configured as a wind turbine 114, the power generating asset 100 may generally include a tower 102 extending from a support surface 104, a nacelle 106, mounted on the tower 102, and a rotor 108 coupled to the nacelle 106. The rotor 108 may include a rotatable hub 110 and at least one rotor blade 112 coupled to, and extending outwardly from, the hub 110. For example, in the illustrated embodiment, the rotor 108 includes three rotor blades 112. However, in an additional embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

The power generating asset 100 may also include a controller 200. When configured as a wind turbine 114, the controller 200 may be configured as a turbine controller centralized within the nacelle 106. However, in other embodiments, the controller 200 may be located within any other component of the wind turbine 114 or at a location outside the wind turbine. Further, the controller 200 may be communicatively coupled to any number of the components of the power generating asset 100 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing wind turbine control signals.

Figure 2:
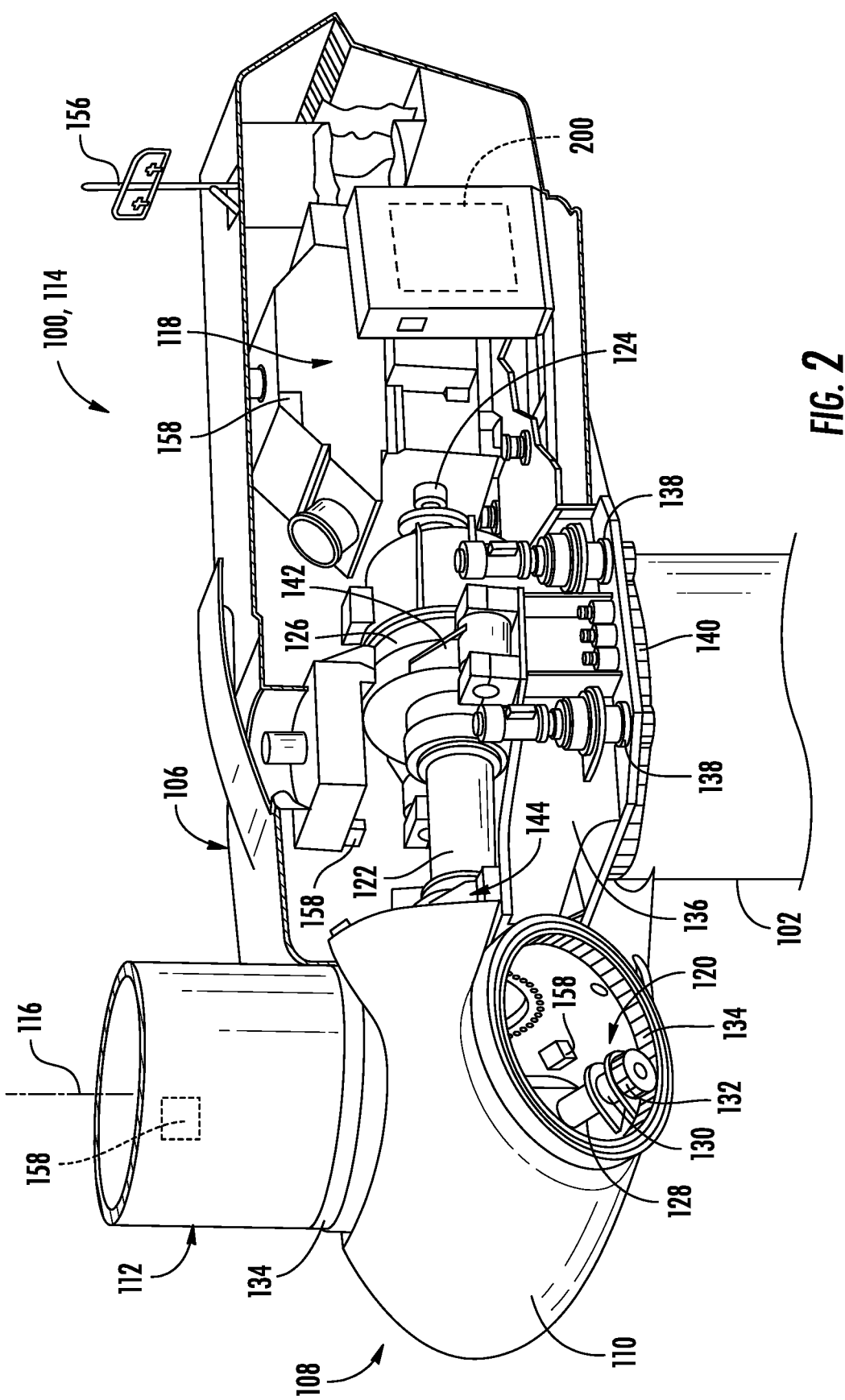
FIG. 2 illustrates a perspective, internal view of one embodiment of a nacelle of the wind turbine according to the present disclosure.

Referring now to FIG. 2, a simplified, internal view of one embodiment of the nacelle 106 of the wind turbine 114 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through a gearbox 126 connected to a bedplate support frame 136. As is generally understood, the rotor shaft 122 may provide a low-speed, high-torque input to the gearbox 126 in response to rotation of the rotor blades 112 and the hub 110. The gearbox 126 may then be configured to convert the low-speed, high-torque input to a high-speed, low-torque output to drive the high-speed shaft 124 and, thus, the generator 118.

Each rotor blade 112 may also include a pitch control mechanism 120 configured to rotate each rotor blade 112 about its pitch axis 116. Each pitch control mechanism 120 may include a pitch drive motor 128, a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116.

It should be appreciated that pitching the rotor blade(s) 112 about the pitch axis 116 may alter an angle of attack between the rotor blade(s) 112 and an apparent wind. Accordingly, the rotor blade(s)112 may pitch to feather when the rotor blade(s) 112 rotates about the pitch axis 116 towards alignment with the apparent wind and to power when the rotor blade(s) rotates towards an orientation generally perpendicular to the apparent wind. It should be further appreciated that pitching to feather generally depowers the rotor blade(s) 112 as a result of a reduction in the resultant lift.

Similarly, the wind turbine 114 may include one or more yaw drive mechanisms 138 communicatively coupled to the controller 200, with each yaw drive mechanism(s) 138 being configured to change the angle of the nacelle 106 relative to the wind (e.g., by engaging a yaw bearing 140 of the wind turbine 114). It should be appreciated that the controller 200 may direct the yawing of the nacelle 106 and/or the pitching of the rotor blades 112 so as to aerodynamically orient the wind turbine 114 relative to a wind acting on the wind turbine 114, thereby facilitating power production.

In an embodiment, the power generating asset 100 may include an environmental sensor 156 configured for gathering data indicative of one or more environmental conditions. The environmental sensor 156 may be operably coupled to the controller 200. Thus, in an embodiment, the environmental sensor(s) 156 may, for example, be a wind vane, an anemometer, a lidar sensor, thermometer, barometer, or any other suitable sensor. The data gathered by the environmental sensor(s) 156 may include measures of wind speed, wind direction, wind shear, wind gust, wind veer, atmospheric pressure, and/or ambient temperature. In at least one embodiment, the environmental sensor(s) 156 may be mounted to the power generating asset 100 (e.g., to the nacelle 106 at a location downwind of the rotor 108). For example, the environmental sensor(s) 156 may, in alternative embodiments, be coupled to, or integrated with, the rotor 108 and/or positioned within the nacelle 106. It should be appreciated that the environmental sensor(s) 156 may include a network of sensors and may be positioned away from the power generating asset 100.

In addition, the power generating asset 100 may include a at least one operational sensor 158. The operational sensor(s) 158 may be configured to detect a performance of the power generating asset 100, e.g. in response to the environmental condition. For example, the operational sensor(s) 158 may be a rotational speed sensor, a position sensor, an acceleration sensor, and/or an output sensor operably coupled to the controller 200. The operational sensor(s) 158 may be directed at, or integral with, any suitable component of the power generating asset 100. For example, the operational sensor(s) 158 may be directed at the rotor shaft 122 of the wind turbine 114 and/or the generator 118. The operational sensor(s) 158 may gather data indicative of the rotational speed and/or rotational position of the rotor shaft 122, and thus the rotor 108 in the form of a rotor speed and/or a rotor azimuth. The operational sensor(s) 158 may, in an embodiment, be an analog tachometer, a D.C. tachometer, an A.C. tachometer, a digital tachometer, a contact tachometer a non-contact tachometer, or a time and frequency tachometer. In an embodiment, the operational sensor(s) 158 may, for example, be an encoder, such as an optical encoder. Additionally, the operational sensor(s) 158 may be an ammeter, a voltmeter, an ohmmeter, and/or any other suitable sensor for monitoring an electrical condition of the power generating asset 100. Further, in an embodiment, the operational sensor(s) 158 may be a strain gauge, a proximity sensor, a LIDAR, and/or any other suitable sensor configured to detect a displacement of the power generating asset 100 or a component thereof.

It should also be appreciated that, as used herein, the term "monitor" and variations thereof indicates that the various sensors of the power generating asset 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine a condition or response of the power generating asset 100 and/or a component thereof.

Figure 3:
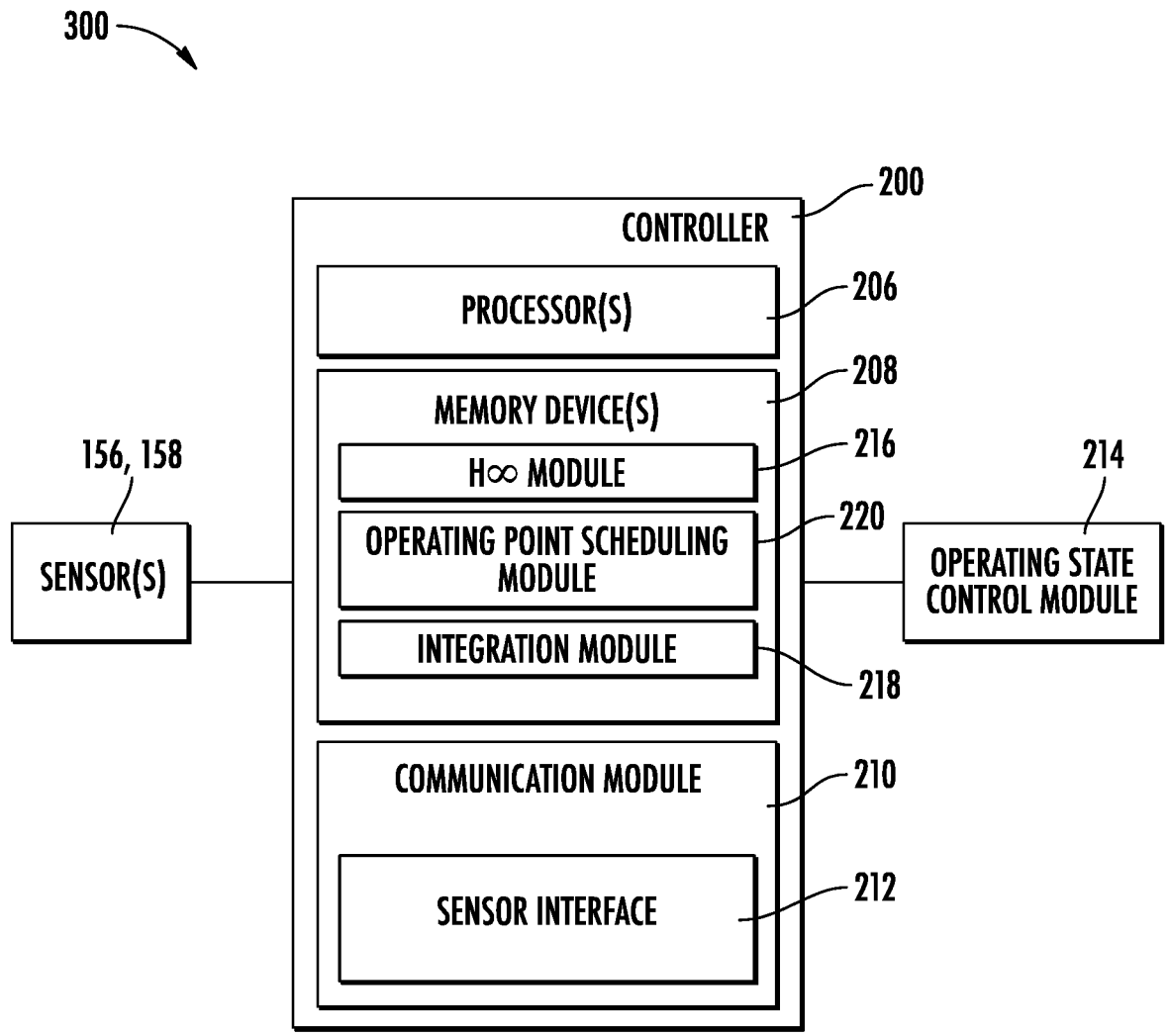
FIG. 3 illustrates a block diagram of one embodiment of a controller for use with the power generating asset according to the present disclosure.
Figure 4:
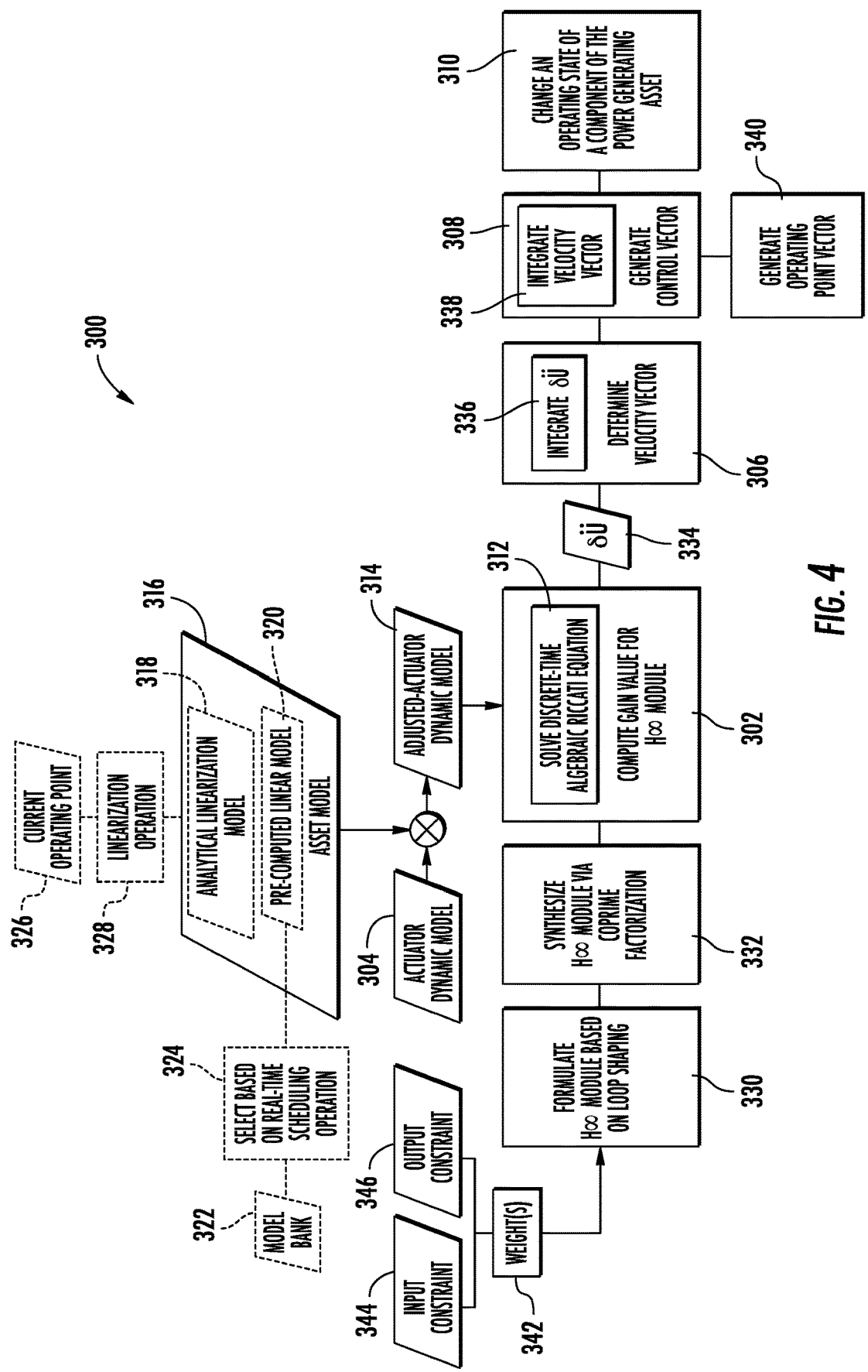
FIG. 4 illustrates a flow diagram of one embodiment of a control logic of a system for controlling a power generating asset according to the present disclosure.
Figure 5:
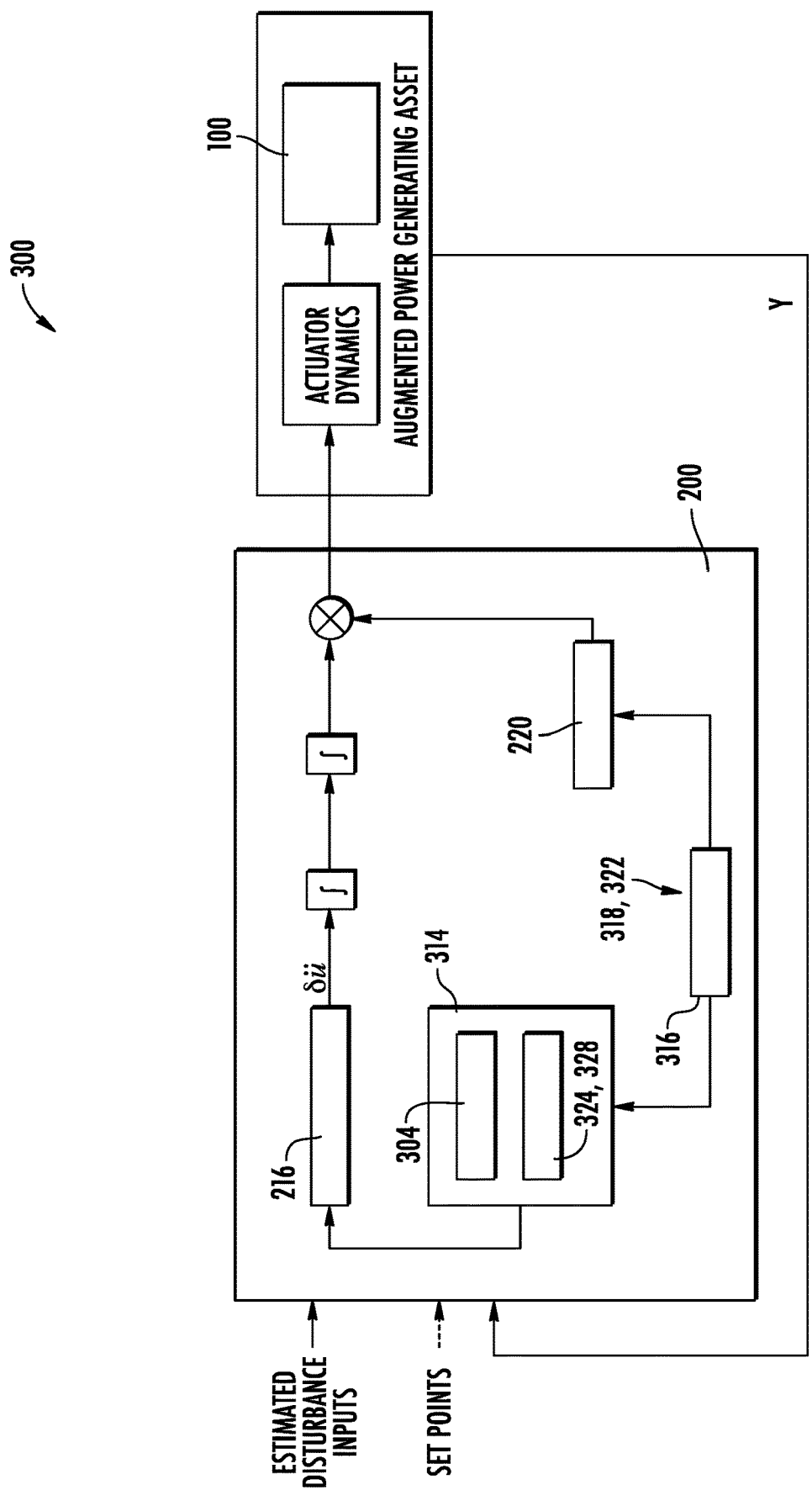
FIG. 5 illustrates an overall closed-loop architecture of a system for controlling a power generating asset according to the present disclosure.

Referring now to FIGS. 3-4, multiple embodiments of a system 300 for controlling the power generating asset 100 according to the present disclosure are presented. As shown particularly in FIG. 3, a schematic diagram of one embodiment of suitable components that may be included within the system 300 is illustrated. For example, as shown, the system 300 may include the controller 200 communicatively coupled to the environmental sensor(s) 156 and/or the operational sensor(s) 158. Further, as shown, the controller 200 includes one or more processor(s) 206 and associated memory device(s) 208 configured to perform a variety of computer-implemented functions (e.g., performing the methods, steps, calculations and the like and storing relevant data as disclosed herein). Additionally, the controller 200, may also include a communications module 210 to facilitate communications between the controller 200, and the various components of the power generating asset 100. Further, the communications module 210 may include a sensor interface 212 (e.g., one or more analog-to-digital converters) to permit signals transmitted from the sensor(s) 156, 158 to be converted into signals that can be understood and processed by the processors 206. It should be appreciated that the sensor(s) 156, 158 may be communicatively coupled to the communications module 210 using any suitable means. For example, the sensor(s) 156, 158 may be coupled to the sensor interface 212 via a wired connection. However, in other embodiments, the sensor(s) 156, 158 may be coupled to the sensor interface 212 via a wireless connection, such as by using any suitable wireless communications protocol known in the art. Additionally, the communications module 210 may also be operably coupled to an operating state control module 214 configured to implement a control action as directed by a control vector.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions including, but not limited to, operating a power generating asset 100 as described herein, as well as various other suitable computer-implemented functions.

Referring particularly to FIG. 4, the controller 200 of the system 300 may be configured to compute a gain value 302 for the H∞ module 216 in real-time at predetermined sampling intervals using an adjusted-actuator dynamic model 314. Based, at least in part on the gain value 302 for the H∞ module 216, the controller may integrate the acceleration vector to determine the velocity vector 306. The velocity vector 306 may be utilized through another integration to generate a control vector 308. As depicted at 310, the control vector 308 may then cause a change in an operating state of at least one component of the power generating asset 100. The change in the operating state may, for example, include a change in pitch, yaw, and/or a torque set point when the power generating asset 100 is configured as the wind turbine 114.

In an embodiment, the adjusted-actuator dynamic model 314 may include an actuator dynamic model 304 and an asset model 316. The adjusted-actuator dynamic model 314 may be determined by combining the actuator dynamic model 304 and the asset model 316. The asset model 316 may, in an embodiment, be an analytical linearization model 318 or at least one pre-computed linear model 320.

In an embodiment wherein the asset model 316 is a pre-computed linear model(s) 320, a model bank 322 of the linearized models of the power generating asset 100 may be prestored and scheduled in real-time (e.g. by wind speed and azimuth angle parameters for the wind turbine 114). Additionally, the current operating point for the power generating asset 100 may also be scheduled at a sampling time. In other words, the pre-computed linear model(s) 320 may employ a bank of linear models which are computed in advance of their utilization by the system 300 and are stored in the controller 200 for real-time scheduling. Therefore, as depicted at 324, in an embodiment, the pre-computed linear model(s) 320 may be selected from the model bank 322 based on a real-time scheduling operation. The granularity of the bank may be based on a desired model accuracy and resolution. For example, a linear model may be computed for the wind turbine 114 for every 10-degrees of azimuth angle for every 1 m/s of wind speed. Accordingly, such an approach may result in pre-computing 765 linear models. It should be appreciated that such an approach may be particularly useful when the memory device(s) 208 have sufficient capacity to store the number of pre-computed linear models 320 required to achieve a desired level of model accuracy and resolution.

In an embodiment wherein the asset model 316 is an analytical linearization model 318, the current operating point 326 for the power generating asset 100 may be determined. Based on the values of the operating point 326, a linearization operation 328 may be accomplished in real-time at the predetermined sampling intervals during operation of the power generating asset 100. Accordingly, the linearization operation 328 may be accomplished at every sampling point.

Regardless of the form of the linear model, in an embodiment, the asset model 316 may have the following linear time-varying dynamic state space form:

$$\delta \dot{x} = A(x,\theta)x + B(x,\theta)u + B_d(x,\theta)d \quad \text{(Equation 1)}$$

$$y = C(x,\theta)x + D(x,\theta)u + D_d(x,\theta)d \quad \text{(Equation 2)}$$

Where $\dot{x}$ are the power generating asset 100 states (e.g., turbine degrees of freedom); u is the set of control inputs (e.g., individual blade pitch angles and generator torque); d are the disturbances (e.g., wind parameters (speed, shear, etc.)); and y are the asset model 316 outputs. The asset model 316 outputs may be a combination of measured outputs and other outputs selected for control.

In an embodiment, state space matrices associated with the linearized models may be time-varying and may depend on an operating state of the power generating asset 100 and/or environmental/operational parameter (e.g., a measured/estimated wind parameter) affecting the power generating asset 100. For example, if the state space matrices are scheduled by azimuth angle and wind speed, the model turns into the following form, wherein the azimuth angle is a model state and the windspeed is an input disturbance parameter:

$$\delta \dot{x} = A(\Psi,\hat{\omega})\delta x + B(\Psi,\hat{\omega})\delta u + B_d(\Psi,\hat{\omega})\delta d, x = \delta x + x_{op} \quad \text{(Equation 3)}$$

$$\delta y = C(\Psi,\hat{\omega})\delta x + D(\Psi,\hat{\omega})\delta u + D_d(\Psi,\hat{\omega})\delta d, y = \delta y + y_{op} \quad \text{(Equation 4)}$$

$$\delta d = \omega - \hat{\omega}, u = \delta u + u_{op} \quad \text{(Equation 5)}$$

Referring still to FIG. 4, in an embodiment, the controller 200 may utilize the adjusted-actuator dynamic model 314 (e.g., pitch and torque actuator models) to compute the gain values 302 for the H∞ module 216 at every sampling interval. The gain values 302 may be calculated by solving exactly two H∞ algebraic Riccati equations 312 at every sampling interval. In other words, in an embodiment, computing the gain value 302 for the H∞ module 216 may include resolving a pair of discrete-time algebraic Riccati equations 312 at each of the predetermined sampling intervals. It should be appreciated that the discrete-time algebraic Riccati equation 312 is a form of nonlinear equation which may arise in the context of infinite-horizon optimal control problems which may yield a unique stabilizing solution, a state-feedback gain, and/or closed-loop eigenvalues.

As depicted at 330, in an embodiment, the H∞ module 216 may be formulated based on loop shaping. Additionally, as depicted at 332, the H∞ module 216 may be synthesized using coprime factorization. In other words, the system 300 may formulate the signal-based H∞ controller synthesis as a loop shaping design problem using a coprime factorization method with the equivalent disturbances being derived and the amount of model uncertainty to be tolerated being calculated. Applying coprime factorization may, in an embodiment, generate a closed-form solution for the controller with optimum disturbance attenuation.

It should be appreciated that the utilization of coprime factorization may eliminate a requirement to employ gamma-iterations in the determination of the gain values 302. Therefore, the utilization of coprime factorization may permit the synthesis of the H∞ module 216 at more frequent intervals than would be possible utilizing gamma-iterations. For example, the utilization of coprime factorization may facilitate the resolution of a pair of discrete-time algebraic Riccati equations 312 at each sampling interval. In an embodiment, each of the predetermined sampling intervals may have a duration of less than 100 milliseconds (e.g. less than 50 milliseconds). It should also be appreciated that reducing the duration of the sampling intervals may increase the fidelity of the system 300. As such, in an embodiment, sampling intervals having a duration of less than 50 milliseconds may result in a more refined degree of control of the power generating asset than may be available at longer sampling intervals.

In an embodiment, the output of the H∞ module 216 may be a second derivative 334 of the control vector 308. As depicted at 336, in an embodiment, an integration module 218 may be utilized by the controller 200 to generate the velocity vector 306 by integrating the second derivative 334 of the control vector 308. Additionally, as depicted at 338, in an embodiment, the integration module 218 may be utilized to integrate the velocity vector 306 so as to determine the control vector 308. Due to using a linearized model around a time-varying operating point, this control vector may be relative to the linearization point (i.e. a delta around the current control operating point). The actual control to the actuators may then be computed by the current adding operating point to the computed delta control commands as shown in equations 3-5.

As further depicted by FIG. 4, in an embodiment, an operating point vector 340 may be generated by an operating point scheduling module 220. The operating point vector 340 may be a vector representation of the current operating point 326 for the power generating asset 100. In an embodiment, the operating point vector 340 may be combined with the control vector 338 to generate the control vector 308.

As depicted at 342, in an embodiment, the control loop of the system 300 may be shaped via weighting. The weighting may be employed to address at least one input constraint 344 and/or at least one output constraint 346. As such, the weighting may be applied to the adjusted-actuator dynamic model 314 to formulate the H∞ loop shaping in 330. The input and output constraints 344, 346 may be represented by static matrices or dynamic transfer matrices using input/output limits. In an embodiment, the input and output constraints 344, 346 may include an operational constraint and/or a performance constraint. In an embodiment, the operational and performance constraints may, for example, include a structural loading constraint, an actuator constraint, a speed regulation, a power regulation, and/or a set point tracking performance specification.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for controlling a power generating asset, the method comprising: computing, via a controller, a gain value for an H-infinity (H∞) module in real-time at predetermined sampling intervals using an adjusted-actuator dynamic model; determining, via the controller, an acceleration vector based, at least in part, on the gain value for the H∞ module; generating, via the controller, a control vector based at least in part on the acceleration vector; and changing an operating state of at least one component of the power generating asset based the control vector.

Clause 2. The method of clause 1, wherein generating the control vector further comprises: combining, via the controller, the acceleration vector from the H∞ module with an operating point vector generated by an operating point scheduling module.

Clause 3. The method of any preceding clause, wherein the adjusted-actuator dynamic model comprises an asset model and an actuator dynamic model, wherein the asset model is combined with the actuator dynamic model.

Clause 4. The method of any preceding clause, further comprising: weighting at least one of the adjusted-actuator dynamic model and the acceleration vector based on at least one of an input constraint and an output constraint.

Clause 5. The method of any preceding clause, wherein at least one of the input constraint and the output constraint comprises at least one of an operational constraint and a performance constraint, wherein the operational and performance constraints comprises at least one of a structural loading constraint, an actuator constraint, a speed regulation, a power regulation, and a set point tracking performance specification.

Clause 6. The method of any preceding clause, wherein computing the gain value for the H∞ module further comprises: resolving, via the controller, a pair of discrete-time algebraic Riccati equations at each of the predetermined sampling intervals.

Clause 7. The method of any preceding clause, wherein the H∞ module is formulated based on loop shaping and is synthesized using coprime factorization.

Clause 8. The method of any preceding clause, wherein applying the coprime factorization generates a closed-form solution for the controller.

Clause 9. The method of any preceding clause, wherein each of the predetermined sampling intervals has a duration of less than 50 milliseconds.

Clause 10. The method of any preceding clause, wherein an output of the H∞ module comprises a second derivative of the control vector, and wherein generating the control vector further comprises: integrating, via an integration module, the second derivative of the control vector so as to determine the acceleration vector; and integrating, via the integration module, the acceleration vector so as to determine the control vector.

Clause 11. The method of any preceding clause, wherein the actuator dynamic model comprises an adjusted-actuator dynamic model determined by adjusting, via a controller, the actuator dynamic model using an asset model, and wherein the asset model comprises an analytical linearization model or at least one precomputed linear model.

Clause 12. The method of any preceding clause, wherein the at least one precomputed linear model is selected from a model bank of precomputed linear models, and wherein the selection is based on a real-time scheduling operation.

Clause 13. The method of any preceding clause, wherein adjusting the actuator dynamic model with the asset model further comprises: determining the analytical linearization model via a linearization operation in real-time at the predetermined sampling intervals during operation of the power generating asset, wherein the linearization operation is based on a current operating point value for the power generating asset present at a point of linearization.

Clause 14. A system for operating a power generating asset, the system comprising: at least one sensor operably coupled to the power generating asset; and a controller communicatively coupled to the at least one sensor, the controller comprising at least one processor configured to perform a plurality of operations, the plurality of operations comprising: computing a gain value for an H-infinity (H∞) module in real-time at predetermined sampling intervals using an adjusted-actuator dynamic model; determining an acceleration vector based, at least in part, on the gain value for the H∞ module, generating a control vector based at least in part on the acceleration vector, and changing an operating state of at least one component of the power generating asset based the control vector.

Clause 15. The system of any preceding clause, wherein generating the control vector further comprises: combining the acceleration vector from the H∞ module with an operating point vector generated by an operating point scheduling module.

Clause 16. The system of any preceding clause, wherein the adjusted-actuator dynamic model comprises an asset model and an actuator dynamic model, wherein the asset model is combined with the actuator dynamic model, and wherein the plurality of operations further comprise: weighting at least one of the adjusted-actuator dynamic model and the acceleration vector based on at least one of an input constraint and an output constraint, wherein at least one of the input constraint and the output constraint comprises at least one of an operational constraint and a performance constraint, wherein the operational and performance constraints comprises at least one of a structural loading constraint, an actuator constraint, a speed regulation, a power regulation, and a set point tracking performance specification.

Clause 17. The system of any preceding clause, wherein computing the gain value for the H∞ module further comprises: resolving a pair of discrete-time algebraic Riccati equations at each of the predetermined sampling intervals.

Clause 18. The system of any preceding clause, wherein determining the acceleration vector further comprises: applying a coprime factorization loop shaping to a plurality of current operating point values for the power generating asset in order to determine the acceleration vector at each of the predetermined sampling intervals.

Clause 19. The system of any preceding clause, wherein an output of the H∞ module comprises a second order derivative of the acceleration vector, and wherein determining the acceleration vector further comprises: integrating, via an integration module, the second order derivative so as to determine the acceleration vector.

Clause 20. The system of any preceding clause, wherein the actuator dynamic model comprises an adjusted-actuator dynamic model determined by adjusting the actuator dynamic model using an asset model, and wherein the asset model comprises an analytical linearization model or at least one precomputed linear model, wherein the at least one precomputed linear model is selected from a model bank of precomputed linear models, and wherein the selection is based on a real-time scheduling operation, and wherein the linearization operation is based on a current operating point value for the power generating asset present at a point of linearization.

What is claimed is:

1. A method for controlling a power generating asset, the method comprising:
   computing, via a controller, a gain value for an H-infinity (H∞) module in real-time at predetermined sampling intervals using an adjusted-actuator dynamic model;
   determining, via the controller, an acceleration vector based, at least in part, on the gain value for the H∞ module;
   generating, via the controller, a control vector based at least in part on the acceleration vector;
   changing an operating state of at least one component of the power generating asset based the control vector; and
   weighting at least one of the adjusted-actuator dynamic model or the acceleration vector based on at least one of an input constraint or an output constraint.

2. The method of claim 1, wherein generating the control vector further comprises:
   combining, via the controller, the acceleration vector from the H∞ module with an operating point vector generated by an operating point scheduling module.

3. The method of claim 2, wherein the adjusted-actuator dynamic model comprises an asset model and an actuator dynamic model, wherein the asset model is combined with the actuator dynamic model.

4. The method of claim 3, wherein the asset model comprises an analytical linearization model or at least one precomputed linear model.

5. The method of claim 4, wherein the at least one precomputed linear model is selected from a model bank of precomputed linear models, and wherein the selection is based on a real-time scheduling operation.

6. The method of claim 4, further comprising:
   determining the analytical linearization model via a linearization operation in real-time at the predetermined sampling intervals during operation of the power generating asset, wherein the linearization operation is based on a current operating point value for the power generating asset present at a point of linearization.

7. The method of claim 1, wherein at least one of the input constraint and the output constraint comprises at least one of an operational constraint or a performance constraint, wherein the operational and performance constraints comprises at least one of a structural loading constraint, an actuator constraint, a speed regulation, a power regulation, and a set point tracking performance specification.

8. The method of claim 1, wherein computing the gain value for the H∞ module further comprises:
   resolving, via the controller, a pair of discrete-time algebraic Riccati equations at each of the predetermined sampling intervals.

9. The method of claim 8, wherein the H∞ module is formulated based on loop shaping and is synthesized using coprime factorization.

10. The method of claim 9, wherein applying the coprime factorization generates a closed-form solution for the controller.

11. The method of claim 10, wherein each of the predetermined sampling intervals has a duration of less than 50 milliseconds.

12. The method of claim 1, wherein an output of the H∞ module comprises a second derivative of the control vector, and wherein generating the control vector further comprises:
   integrating, via an integration module, the second derivative of the control vector so as to determine the velocity vector; and
   integrating, via the integration module, the velocity vector so as to determine the control vector around an operating point.

13. A system for operating a power generating asset, the system comprising:
   at least one sensor operably coupled to the power generating asset; and
   a controller communicatively coupled to the at least one sensor, the controller comprising at least one processor configured to perform a plurality of operations, the plurality of operations comprising:
      computing a gain value for an H-infinity (H∞) module in real-time at predetermined sampling intervals using an adjusted-actuator dynamic model;
      determining an acceleration vector based, at least in part, on the gain value for the H∞ module,
      generating a control vector based at least in part on the acceleration vector,
      changing an operating state of at least one component of the power generating asset based the control vector, and
      weighting at least one of the adjusted-actuator dynamic model or the acceleration vector based on at least one of an input constraint or an output constraint.

14. The system of claim 13, wherein generating the control vector further comprises:
   combining the acceleration vector from the H∞ module with an operating point vector generated by an operating point scheduling module.

15. The system of claim 14, wherein the adjusted-actuator dynamic model comprises an asset model and an actuator dynamic model, wherein the asset model is combined with the actuator dynamic model, and
   wherein at least one of the input constraint or the output constraint comprises at least one of an operational constraint and a performance constraint, wherein the operational and performance constraints comprises at least one of a structural loading constraint, an actuator constraint, a speed regulation, a power regulation, and a set point tracking performance specification.

16. The system of claim 13, wherein computing the gain value for the H∞ module further comprises:
   resolving a pair of discrete-time algebraic Riccati equations at each of the predetermined sampling intervals.

17. The system of claim 16, wherein determining the acceleration vector further comprises:
   applying a coprime factorization loop shaping to a plurality of current operating point values for the power generating asset in order to determine the acceleration vector at each of the predetermined sampling intervals.

18. The system of claim 13, wherein an output of the H∞ module comprises a second derivative of the control vector, and wherein generating the control vector further comprises:
   integrating, via an integration module, the second derivative of the control vector so as to determine the velocity vector; and
   integrating, via the integration module, the velocity vector so as to determine the control vector around an operating point.

19. The system of claim 13, wherein the actuator dynamic model comprises an adjusted-actuator dynamic model determined by adjusting the actuator dynamic model using an asset model, and wherein the asset model comprises an analytical linearization model or at least one precomputed linear model, wherein the at least one precomputed linear model is selected from a model bank of precomputed linear models, and wherein the selection is based on a real-time scheduling operation, and wherein the linearization operation is based on a current operating point value for the power generating asset present at a point of linearization.

* * * * *